United States Patent
Akizuki et al.

(10) Patent No.: US 11,203,382 B2
(45) Date of Patent: Dec. 21, 2021

(54) COWL TOP STRUCTURE

(71) Applicant: HONDA MOTOR CO., LTD., Tokyo (JP)

(72) Inventors: Yosuke Akizuki, Wako (JP); Junichi Maruyama, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 45 days.

(21) Appl. No.: 16/695,240

(22) Filed: Nov. 26, 2019

(65) Prior Publication Data

US 2020/0207422 A1 Jul. 2, 2020

(30) Foreign Application Priority Data

Dec. 26, 2018 (JP) .............................. JP2018-242640

(51) Int. Cl.
| | |
|---|---|
| *B62D 25/08* | (2006.01) |
| *B62D 25/24* | (2006.01) |
| *B62D 27/06* | (2006.01) |
| *B62D 27/02* | (2006.01) |
| *B62D 25/10* | (2006.01) |
| *B60R 21/34* | (2011.01) |
| *B60R 13/07* | (2006.01) |
| *B62D 25/12* | (2006.01) |

(52) U.S. Cl.
CPC .......... *B62D 25/081* (2013.01); *B62D 25/24* (2013.01); *B62D 27/026* (2013.01); *B62D 27/06* (2013.01); *B60R 13/07* (2013.01); *B60R 21/34* (2013.01); *B60R 2021/343* (2013.01); *B62D 25/08* (2013.01); *B62D 25/105* (2013.01); *B62D 25/12* (2013.01)

(58) Field of Classification Search
CPC .... B62D 25/081; B62D 27/026; B62D 27/06; B62D 25/24; B62D 25/105; B62D 25/12; B62D 25/08; B60R 2021/343; B60R 21/34; B60R 13/07
USPC ........................................................ 296/192
See application file for complete search history.

(56) References Cited

U.S. PATENT DOCUMENTS

| | | | |
|---|---|---|---|
| 2012/0200118 A1* | 8/2012 | Yamagishi | ........... B62D 25/163 296/192 |
| 2016/0082900 A1* | 3/2016 | Saeki | ...................... B60R 21/34 296/192 |

FOREIGN PATENT DOCUMENTS

| | | |
|---|---|---|
| JP | 4843815 | 12/2011 |
| JP | 2013-023177 | 2/2013 |
| JP | 2015-214244 | 12/2015 |
| JP | 2018-075997 | 5/2018 |

OTHER PUBLICATIONS

Japanese Office Action for Japanese Patent Application No. 2018-242640 dated Sep. 1, 2020.

* cited by examiner

*Primary Examiner* — Joseph D. Pape
*Assistant Examiner* — Dana D Ivey
(74) *Attorney, Agent, or Firm* — Amin, Turocy & Watson, LLP

(57) ABSTRACT

A cowl top structure is provided along a lower edge of a front glass in a vehicle width direction. The cowl top structure includes a raised section, a fragile section and a drainage passage. The raised section is formed on a left end portion of a cowl top. The fragile section is formed on the raised section. The drainage passage is provided in a surrounding of the raised section and formed to drain water to an outer side of a vehicle body.

14 Claims, 13 Drawing Sheets

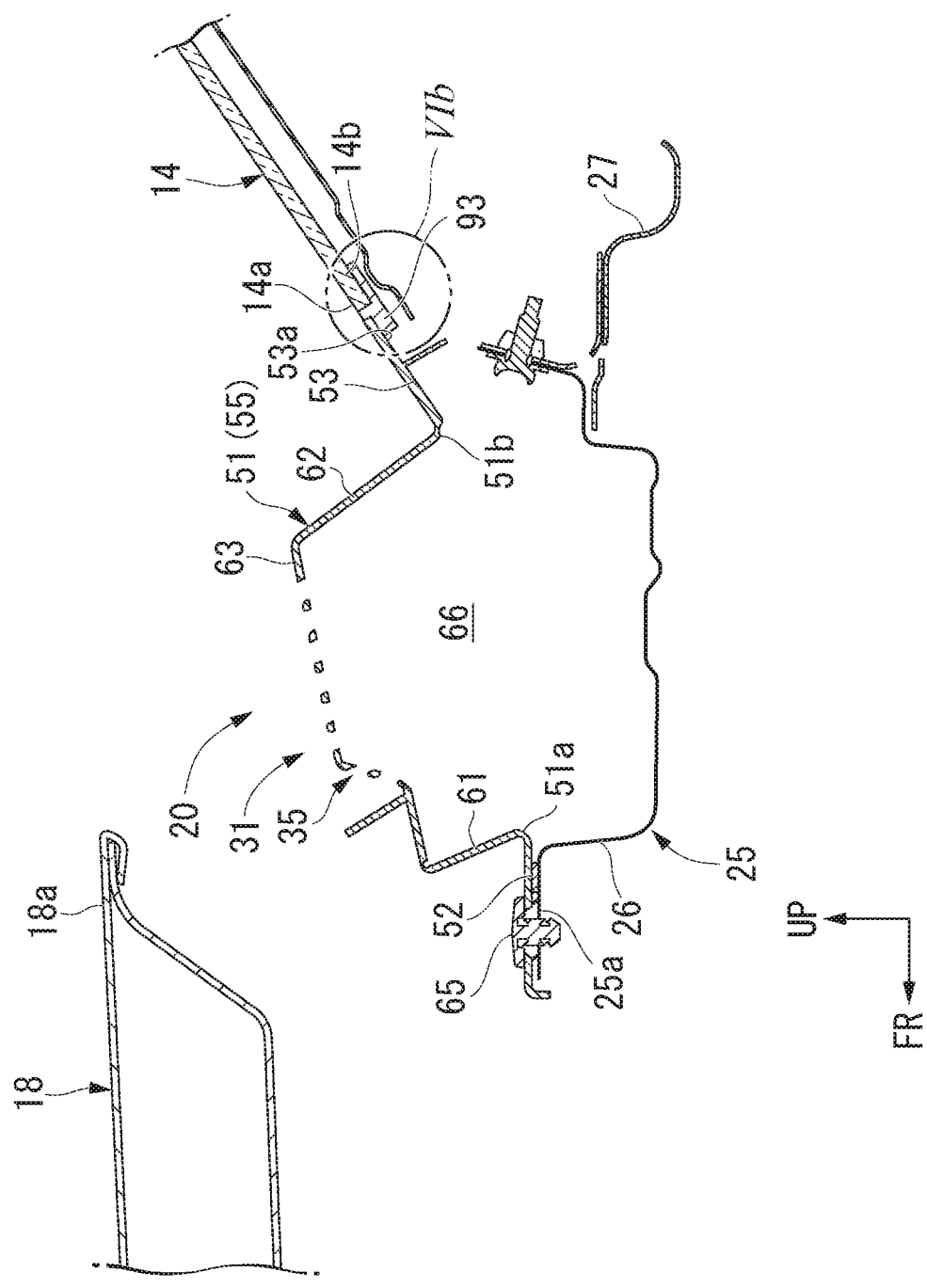

COWL TOP STRUCTURE

CROSS-REFERENCE TO RELATED APPLICATION

Priority is claimed on Japanese Patent Application No. 2018-242640, filed Dec. 26, 2018, the content of which is incorporated herein by reference.

BACKGROUND OF THE INVENTION

Field of the Invention

The present invention relates to a cowl top structure.

Description of Related Art

In the related art, intrusion of rainwater or the like into a cowl box provided between a lower edge of a front glass and a rear edge of an engine hood of an automobile is minimized by covering it with a cowl top formed of a resin. The cowl top extends along the lower edge of the front glass and is curved at an outer end portion. A cowl top structure includes, for example, a cowl top disposed throughout most of both side portions from a central section of the lower edge of the front glass, and side covers provided on both end portions. In the cowl top structure, for example, a case in which rainwater or the like accumulates on an upper surface of the cowl top can be considered.

As a countermeasure, for example, a configuration in which a drainage trench extending in a vehicle width direction is formed in a cowl top, a water passage is provided between the cowl top and a side cover, and the water passage is in communication with the drainage trench is known. According to the cowl top structure, rainwater or the like guided from the drainage trench can be drained to the outside via the water passage (for example, see Japanese Patent No. 4843815).

In addition, in the cowl top structure, there is a configuration in which a first fragile section and a second fragile section are provided in a first planar section and a second planar section of a cowl top and protrusion shape sections are provided in the first planar section and the second planar section. The protrusion shape sections are formed to have an inclined angle θ with respect to the first planar section and the second planar section.

According to the cowl top structure, when an impact load is input from above the vehicle body to a rear section or the like of the engine hood upon collision, the engine hood is deformed downward with respect to the vehicle. Since the engine hood is deformed, the rear section of the engine hood interferes with an apex section of the protrusion shape section. In this state, the impact load can be absorbed by concentrating stress in the vicinity of the protrusion shape section and reliably deforming and breaking the first fragile section or the second fragile section (for example, see Japanese Unexamined Patent Application, First Publication No. 2018-75997).

SUMMARY OF THE INVENTION

However, in the cowl top structure disclosed in Japanese Patent No. 4843815, it is difficult to absorb an impact load by appropriately deforming and breaking the cowl top when the engine hood is deformed downward with respect to the vehicle by an impact load input from above the vehicle body to the rear section or the like of the engine hood.

In addition, in the cowl top structure disclosed in Japanese Unexamined Patent Application, First Publication No. 2018-75997, it is difficult to drain water from the cowl top.

An aspect of the present invention is directed to providing a cowl top structure capable of draining water from a cowl top to the outside of a vehicle body, and appropriately deforming and breaking the cowl top.

(1) A cowl top structure of an aspect of the present invention is a cowl top structure including a cowl top provided along a lower edge of a front glass of a vehicle in a vehicle width direction, the cowl top structure including: a raised section formed on an outer end portion of the cowl top; a fragile section formed on the raised section; and a drainage passage formed in a surrounding of the raised section and configured to drain water to an outer side of a vehicle body.

According to the aspect of the above-mentioned (1), the drainage passage can be easily formed in a surrounding of the raised section by forming the raised section on the cowl top. Accordingly, water on the cowl top can be drained to an outer side of the vehicle body from the drainage passage.

In addition, the fragile section is formed on the raised section. Accordingly, when an impact load is input to a rear section or the like of an engine hood from above the vehicle body due to a collision and the engine hood is deformed downward with respect to the vehicle, deformation or breaking can occur from the fragile section. Here, the raised section can accelerate deformation or breaking by concentrating stress on the fragile section. Accordingly, deformation or breaking can reliably occur in the fragile section to appropriately absorb an impact load.

According to the aspect of the above-mentioned (1), by forming the raised section on the cowl top, the drainage passage can be easily formed in a surrounding of the raised section, and stress can be concentrated on the fragile section by the raised section. Accordingly, water can be drained to an outer side of the vehicle body from the cowl top, and the fragile section (i.e., the cowl top) can be reliably deformed and broken.

(2) In the aspect of the above-mentioned (1), the drainage passage may include: a first drainage passage that is formed along an inner wall of the raised section which is inside in the vehicle width direction; and a second drainage passage formed along an outer wall of the raised section which is outside in the vehicle width direction and formed below the first drainage passage in the vehicle, and the cowl top may include: an inclined section provided inside the raised section in the vehicle width direction and formed to have a downward gradient toward the raised section; and a guide rib formed on the inclined section and configured to guide water to the second drainage passage.

According to the aspect of the above-mentioned (2), the first drainage passage is formed along the inner wall of the raised section, and the second drainage passage is formed along the outer wall of the raised section. Accordingly, the wall section of the first drainage passage is formed with the inner wall, and the wall section of the second drainage passage is formed with the outer wall. In addition, the second drainage passage is formed on a side of the vehicle below the first drainage passage. Accordingly, the outer wall is formed higher than the inner wall. Accordingly, the second drainage passage is formed to have a water channel depth dimension larger than that of the first drainage passage. Further, water is guided by the guide rib to the second drainage passage having a large water channel depth dimension.

Accordingly, a depth dimension of the second drainage passage can be made larger than that of the first drainage passage by forming the second drainage passage at a side of the vehicle below the first drainage passage. In addition, by guiding water to the second drainage passage using the guide rib, a large amount of water can be drained from the cowl top, and intrusion of water into the air-conditioner intake port below the cowl top can be reliably minimized.

(3) In the aspect of the above-mentioned (1) or (2), the fragile section that is an opening section may be covered with a side cover.

According to the aspect of the above-mentioned (3), the fragile section can be reliably deformed and broken with an impact load input to the rear section of the engine hood from above the vehicle body by forming the fragile section as an opening. In addition, intrusion of water from the fragile section (i.e., the opening) can be minimized by covering the fragile section with the side cover.

(4) In the aspect of the above-mentioned (3), the raised section may include an outer wall which is outside in the vehicle width direction and which is disposed in a forward/rearward direction of the vehicle body and may include at least one slit formed in the outer wall in the forward/rearward direction of the vehicle body, and the slit may be continuous with the opening section.

According to the aspect of the above-mentioned (4), the slit continuous with the opening section is formed in the outer wall. Accordingly, the opening section can be lengthily formed in the forward/rearward direction of the vehicle body. Accordingly, the outer wall (i.e., the fragile section) can be reliably deformed and broken with an impact load input from above the vehicle body.

(5) In the aspect of the above-mentioned (3) or (4), the cowl top may include a first water stop rib formed on an upper wall of the raised section and abutting an inner surface of the side cover.

According to the aspect of the above-mentioned (5), intrusion of water into the opening section can be reliably minimized by forming the first water stop rib on the upper wall of the raised section and causing the inner surface of the side cover to abut the first water stop rib.

(6) In the aspect of any one of the above-mentioned (3) to (5), the side cover may have a shielding section standing up toward a rear end portion of an engine hood.

According to the aspect of the above-mentioned (6), the shielding section of the side cover stands up toward the rear end portion of the engine hood. Accordingly, a gap between the side cover and the rear end portion of the engine hood can be closed by the shielding section.

(7) In the aspect of the above-mentioned (6), the cowl top may include a second water stop rib standing up from an upper surface of the cowl top and abutting at least one of the side covers below the vehicle body and the side covers in front of the shielding section.

According to the aspect of the above-mentioned (7), the second water stop rib stands up from the cowl top, and the second water stop rib abuts the side covers below the vehicle body and abuts the side covers in front of the shielding section. Accordingly, intrusion of water toward the cowl top from between the side cover and the cowl top can be minimized by the second water stop rib. Accordingly, water can be drained to an outer side of the vehicle body via the shielding drainage passage formed along a rear side of the shielding section in the vehicle body.

(8) In the aspect of the above-mentioned (6) or (7), the shielding section may have a reinforcement rib standing up on a back surface of the shielding section.

According to the aspect of the above-mentioned (8), since the reinforcement rib stands up on the back surface of the shielding section, the shielding section can be thinned and the shielding section can be reduced in weight.

(9) In the aspect of any one of the above-mentioned (3) to (8), the side cover may be formed of a soft material, and may have an extension section protruding outward from the cowl top in the vehicle width direction, and the extension section may be disposed on the vehicle body below a lower end portion of a front pillar garnish.

According to the aspect of the above-mentioned (9), the extension section of the side cover protrudes outward in the vehicle width direction of the cowl top, and is disposed on a side of the vehicle body below the lower end portion of the front pillar garnish. Accordingly, the cowl top can be detached and attached in a state in which the front pillar garnish is not removed from the vehicle. Accordingly, a degree of freedom of maintenance such as wiper repair or the like or an assembly sequence can be increased.

(10) In the aspect of any one of the above-mentioned (3) to (9), the cowl top may include a maintenance opening having a circumferential edge portion thereof raised on the vehicle body in front of the side cover, and the maintenance opening may be covered by a maintenance cover.

According to the aspect of the above-mentioned (10), when the maintenance opening is provided in the cowl top and, for example, the cowl top is installed above the damper base, the damper can be easily assembled from the maintenance opening.

In addition, since the circumferential edge portion of the maintenance opening is raised, intrusion of water into the maintenance opening can be minimized by the circumferential edge portion.

(11) In the aspect of any one of the above-mentioned (1) to (10), the cowl top may have a front end portion fixed to a dash upper lid installed below the cowl top.

According to the aspect of the above-mentioned (11), since the front end portion of the cowl top is fixed to the dash upper lid, the vapor-liquid locking separating chamber can be easily formed below the cowl top.

(12) In the aspect of any one of the above-mentioned (3) to (10), the side cover may be attached to the cowl top through adhesion or engagement.

According to the aspect of the above-mentioned (12), since the side cover is attached to the cowl top through adhesion or engagement, the side cover can be easily and reliably attached to the cowl top.

(13) In the aspect of any one of the above-mentioned (3) to (10), the side cover may include at least one of a locking clip and a locking hole engageable with a rear outer end portion of the cowl top.

According to the aspect of the above-mentioned (13), the side cover includes the locking clip and the locking hole, and the locking clip and the locking hole can be engaged with the rear outer end portion of the cowl top. Accordingly, even in the configuration in which the adhering surface cannot be formed on the rear outer end portion of the cowl top, the side cover can be easily and reliably attached to the rear outer end portion of the cowl top.

(14) In the aspect of the above-mentioned (2), the second drainage passage may be inclined on a downward gradient toward a front of the vehicle body and may drain water to a front of a hood hinge bracket in the vehicle body.

According to the above-mentioned (14), the second drainage passage can be inclined on a downward gradient toward a side in front of the vehicle body, and water can be drained to a side of the vehicle body in front of the hood hinge bracket. The second drainage passage can be formed with the cowl top. Accordingly, the drainage passage can be formed without adding dedicated parts of the drainage passage.

According to the cowl top structure of the aspect of the present invention, the raised section is formed on the outer end portion of the cowl top and the fragile section is formed on the raised section. Further, the drainage passage is formed in a surrounding of the raised section. Accordingly, water can be drained from the cowl top to a rear side of the vehicle body, and the cowl top can be appropriately deformed and broken.

BRIEF DESCRIPTION OF THE DRAWINGS

FIG. 6A is a cross-sectional view along line VI-VI in FIG. 3.

DETAILED DESCRIPTION OF THE INVENTION

Figure 1:
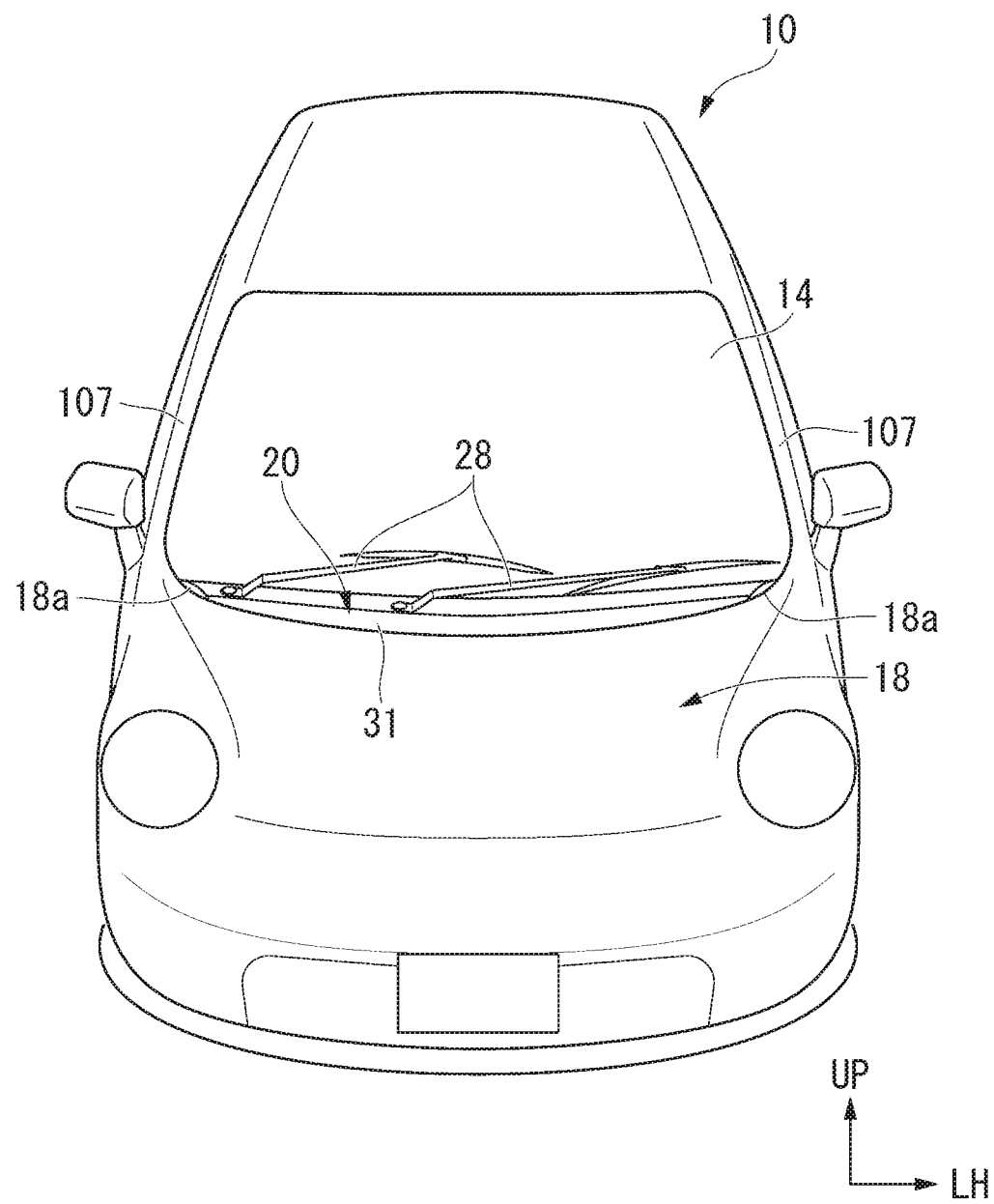
FIG. 1 is a perspective view showing a vehicle including a cowl top structure according to the present invention.

Hereinafter, a cowl top structure 20 of an embodiment of the present invention will be described with reference to the accompanying drawings. In the drawings, an arrow FR indicates a forward direction with respect to a vehicle, an arrow UP indicates an upward direction with respect to the vehicle, and an arrow LH indicates a leftward direction with respect to the vehicle.

A vehicle 10 and the cowl top structure 20 have a substantially symmetric configuration, and hereinafter, a configuration on a left side will be described and description of a configuration on a right side will be omitted.

Figure 2:
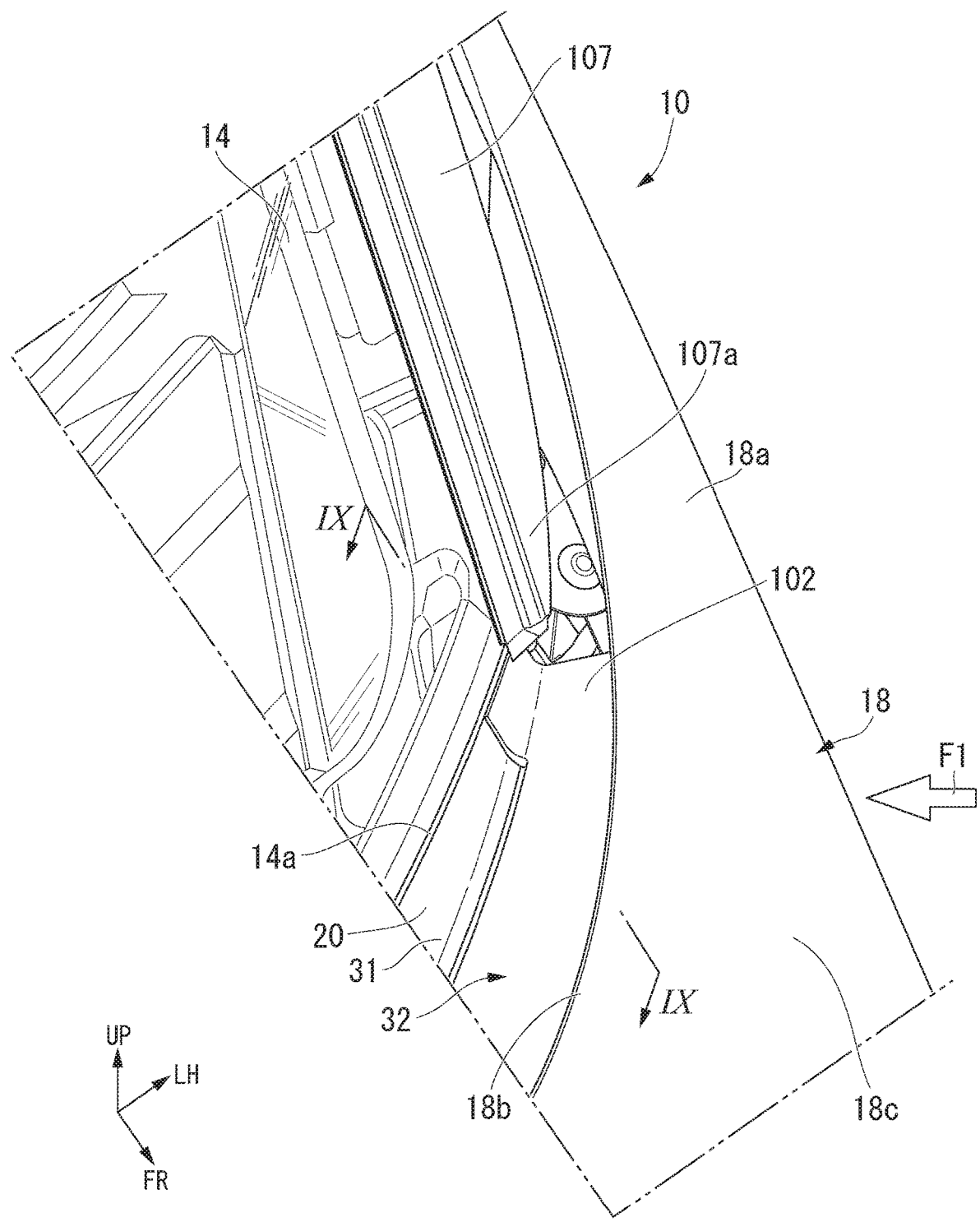
FIG. 2 is an enlarged perspective view of a left side portion of the vehicle in FIG. 1.
Figure 3:
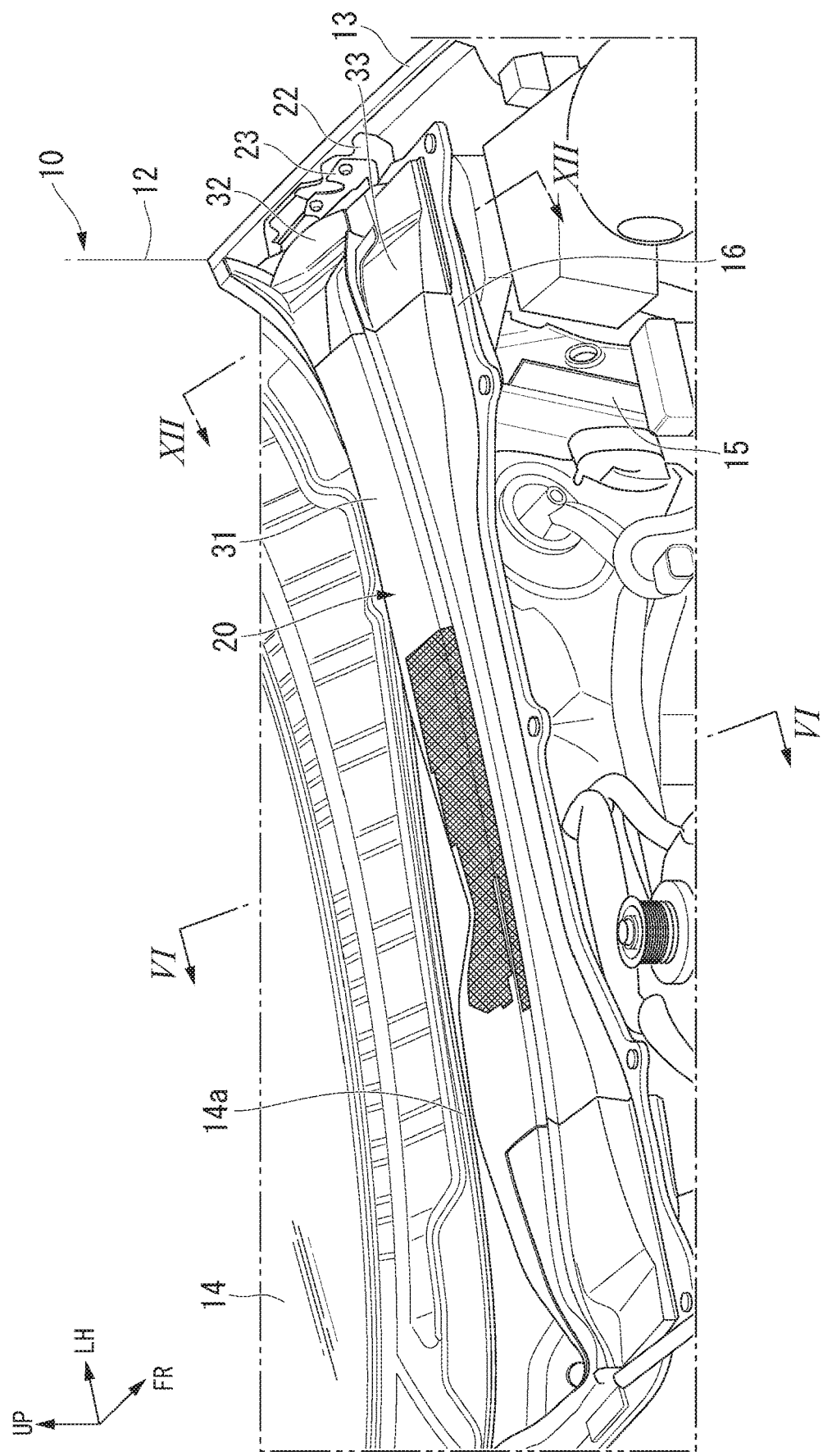
FIG. 3 is a perspective view showing the cowl top structure according to the present invention.

As shown in FIG. 1, FIG. 2 and FIG. 3, the vehicle 10 includes a front pillar 12, an upper member 13, a front glass (a windshield glass) 14, a damper housing 15, a damper base 16, an engine hood (a bonnet) 18 and the cowl top structure 20.

The upper member 13 extends from the front pillar 12 toward a side in front of the vehicle body. The front glass 14 is provided inside the front pillar 12 in the vehicle width direction. The damper housing 15 is provided at front of the front pillar 12 in the vehicle body and at inside the upper member 13 in the vehicle width direction (i.e., an engine room 21). The damper base 16 is provided on an apex section of the damper housing 15. The cowl top structure 20 is provided on the damper base 16.

Figure 4:
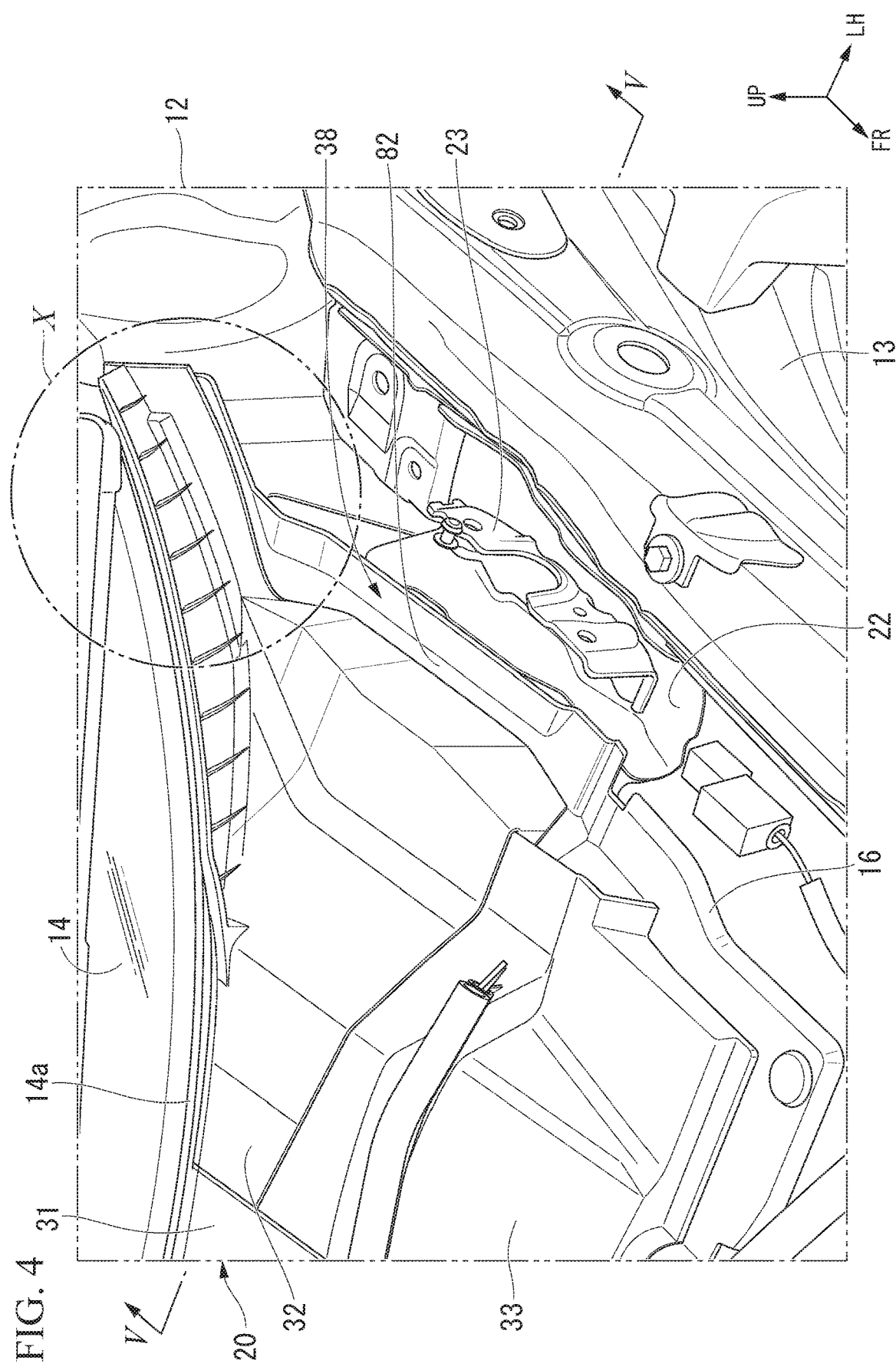
FIG. 4 is a perspective view of a left side portion of the cowl top structure according to the present invention.
Figure 5:
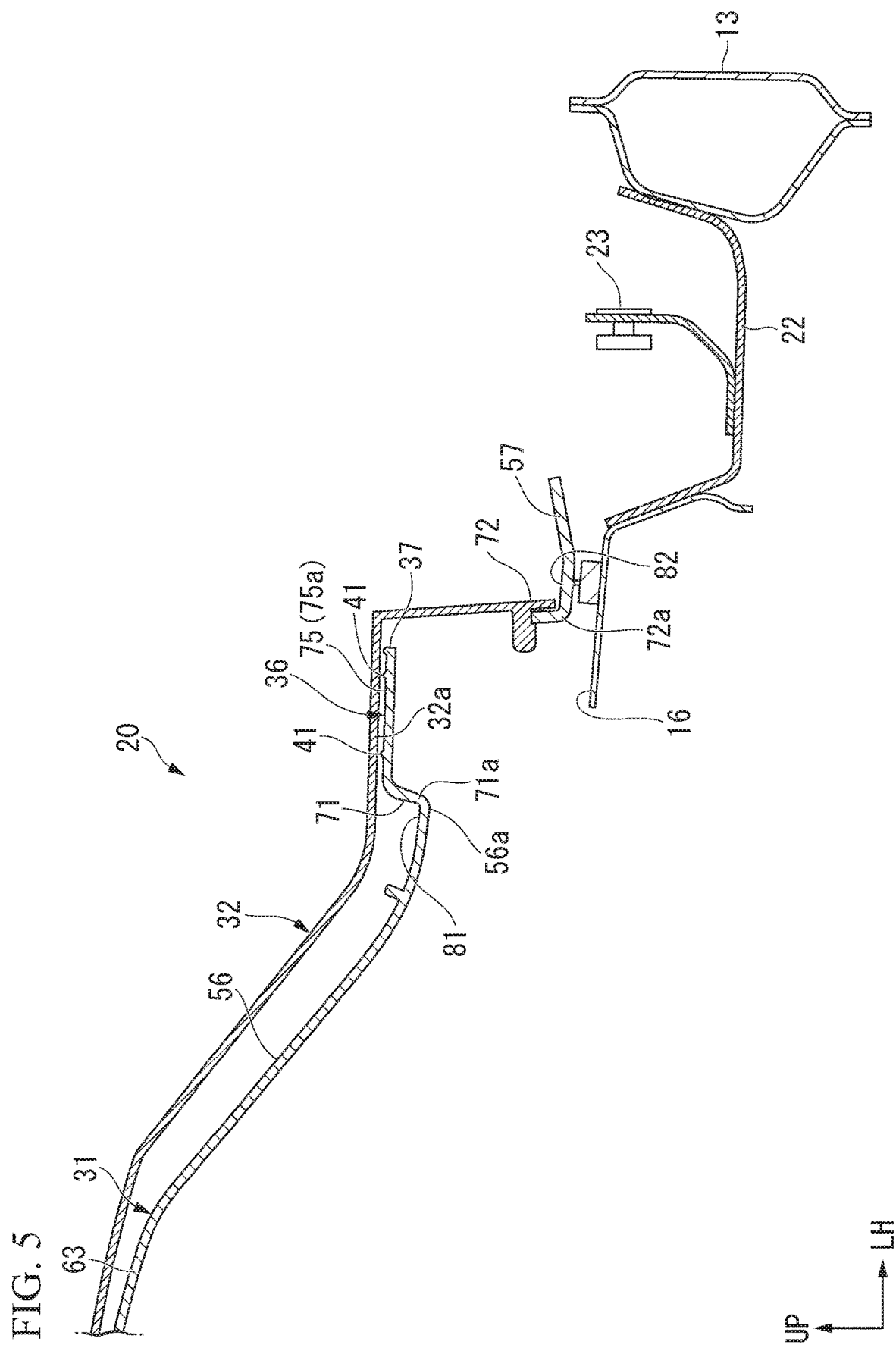
FIG. 5 is a cross-sectional view along line V-V in FIG. 4.

As shown in FIG. 2, FIG. 4 and FIG. 5, a hood hinge bracket 22 is provided on the upper member 13 and the damper base 16. A hood hinge 23 is provided on the hood hinge bracket 22. A rear end portion 18a of the engine hood 18 is supported by the hood hinge 23. The cowl top structure 20 is disposed between a rear edge 18b of the engine hood 18 and a lower edge 14a of the front glass 14 in the vehicle width direction.

As shown in FIG. 6A, the cowl top structure 20 is fixed to a dash upper lid 25. A cowl box 26 is formed by the dash upper lid 25 and a cowl top 31 (to be described below) of the cowl top structure 20. The dash upper lid 25 is fixed to an upper end portion of a dashboard lower section 27. The dash upper lid 25 extends along the cowl top structure 20 in the vehicle width direction. The dashboard lower section 27 is provided in a standing-up posture to separate a passenger compartment and the engine room 21 in the vehicle width direction.

As shown in FIG. 1, the cowl top structure 20 has a function of introducing external air into the passenger compartment or the air-conditioner and minimizing intrusion of rainwater or the like into the cowl box 26. A pivot shaft of a wiper 28 protrudes from the cowl top structure 20. Hereinafter, rainwater or the like is abbreviated as "water."

Figure 7:
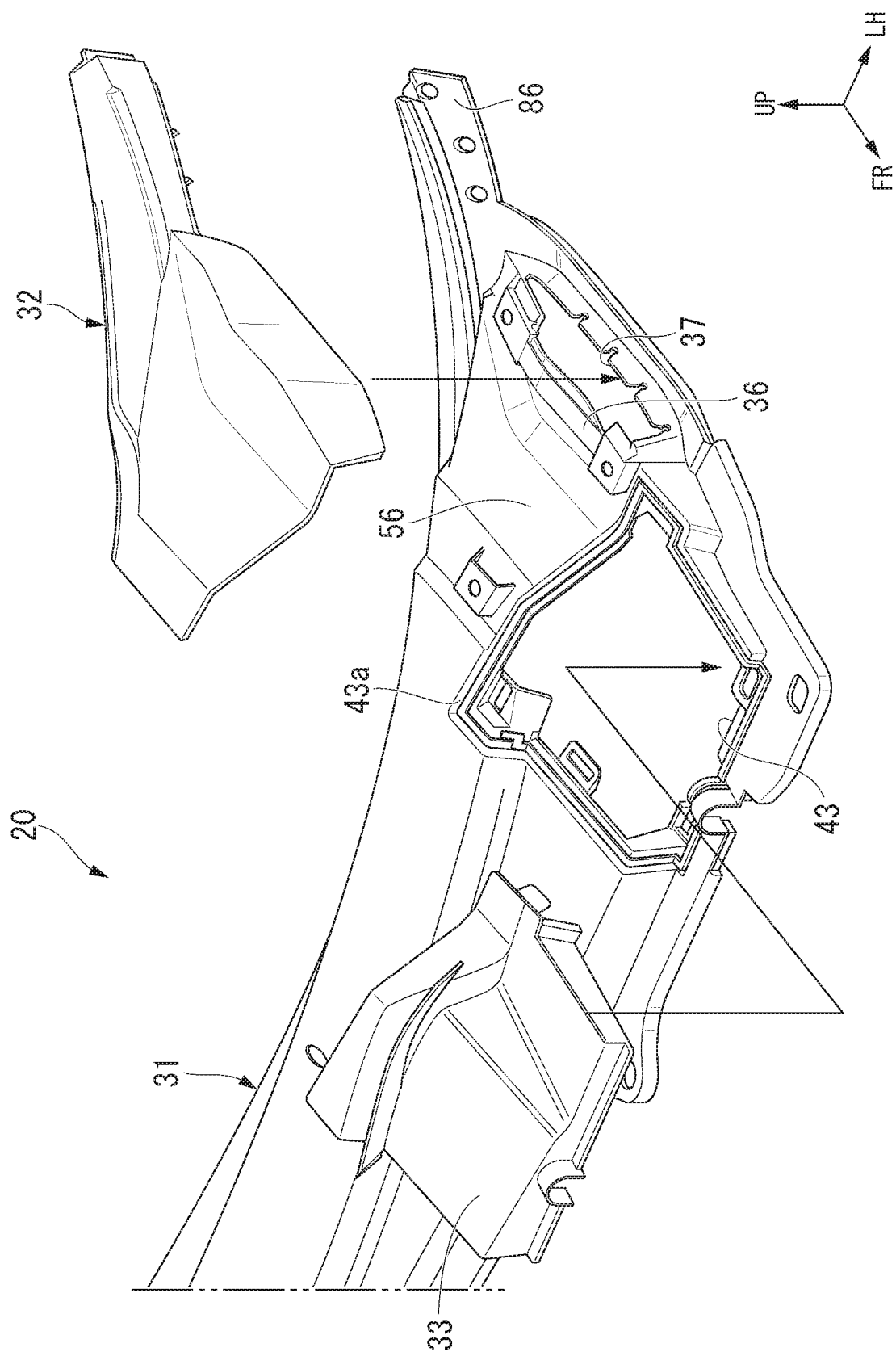
FIG. 7 is an exploded perspective view showing the cowl top structure according to the present invention.

As shown in FIG. 7, the cowl top structure 20 includes the cowl top 31, a side cover 32 and a maintenance cover 33. The cowl top structure 20 has a substantially symmetrical configuration, and hereinafter, a configuration on a left side will be described and description of a configuration on a right side will be omitted.

Figure 8:
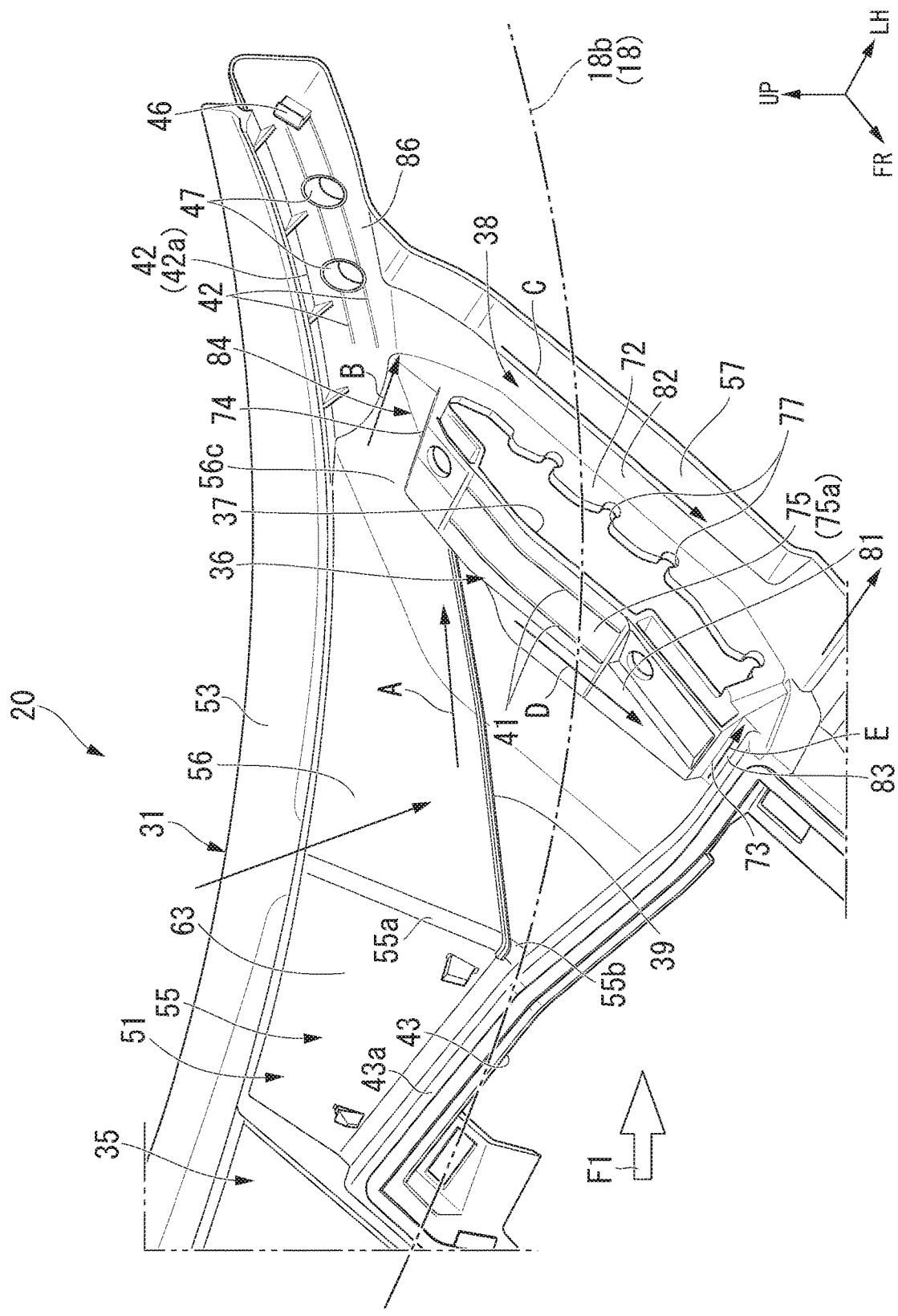
FIG. 8 is a perspective view showing the cowl top according to the present invention.

As shown in FIG. 6A and FIG. 8, the cowl top 31 includes a cowl top main body 35, a raised section 36, a fragile section 37, a drainage passage 38, a guide rib 39, a first water stop rib 41, a second water stop rib 42, a maintenance opening 43, a cowl clip 46 and a plurality of cowl holes 47.

The cowl top main body 35 is provided along the lower edge 14a of the front glass 14 in the vehicle width direction. The cowl top main body 35 includes a swelling section 51, a front flange (a front end portion) 52 and a rear flange (a rear end portion) 53. The swelling section 51 includes a swelling central section 55, an inclined section 56 and a left end portion (an outer end portion) 57.

The swelling central section 55 includes a front wall 61, a rear wall 62 and an apex section 63. The front wall 61 stands up obliquely toward a side in front of the vehicle body. The rear wall 62 is disposed at an interval with the front wall 61 in a direction of the vehicle body, and stands up obliquely toward a side in front of the vehicle body. The apex section 63 is connected to an upper side of the front wall 61 and an upper side of the rear wall 62. The swelling section 51 is formed in a U-shaped cross section by the front wall 61, the rear wall 62 and the apex section 63.

The inclined section 56 is connected to a left end 55a of the swelling central section 55. The inclined section 56 is formed on a downward gradient toward a left outer side in the vehicle width direction from the left end 55a to the left end portion 57 of the swelling section 51.

The left end portion 57 is connected to a left end 56a (see FIG. 5) of the inclined section 56. The left end portion 57 protrudes from the left end 56a of the inclined section 56 toward a left outer side in the vehicle width direction.

The front flange 52 protrudes from a front lower side 51a of the swelling section 51 toward a side in front of the vehicle body.

The front flange 52 is fixed to a front flange 25a of the dash upper lid 25 by a plurality of fastening members 65 (for example, fastening clips). Accordingly, a vapor-liquid locking separating chamber 66 can be easily formed below the cowl top 31.

The rear flange 53 protrudes from a rear lower side 51b of the swelling section 51 toward a side behind the vehicle body (specifically, the lower edge 14a of the front glass 14).

As shown in FIG. 5 and FIG. 8, the raised section 36 is formed on the left end portion 57 of the swelling section 51. The raised section 36 includes an inner wall 71, an outer wall 72, a front end wall 73, a rear end wall 74 and an upper wall 75. The inner wall 71 stands upward from the left end 56a of the inclined section 56 and is disposed in the forward/rearward direction of the vehicle body.

The outer wall 72 stands upward from a left side in the vehicle width direction at an interval with the inner wall 71. The outer wall 72 is disposed in the forward/rearward direction of the vehicle body, and a lower side 72a thereof is disposed at the vehicle body below a lower side 71a of the inner wall 71.

The front end wall 73 is connected to a front end of the inner wall 71 and a front end of the outer wall 72. The rear end wall 74 is connected to a rear end of the inner wall 71 and a rear end of the outer wall 72. The raised section 36 is formed in a rectangular frame shape extending in the forward/rearward direction of the vehicle body when seen in a plan view by the inner wall 71, the outer wall 72, the front end wall 73 and the rear end wall 74.

The upper wall 75 is connected to upper sides of the inner wall 71, the front end wall 73 and the rear end wall 74. Accordingly, the raised section 36 that is raised upward from the left end portion 57 is formed.

The plurality of first water stop ribs 41 are formed on an upper surface 75a of the upper wall 75 at intervals in the vehicle width direction. The first water stop rib 41 stands upward from the upper surface 75a of the upper wall 75, and extends along the upper wall 75 in the forward/rearward direction of the vehicle body. An inner surface 32a of the side cover 32 abuts the first water stop rib 41. In addition, the inclined section 56 is provided inside the raised section 36 in the vehicle width direction. The inclined section 56 is formed on a downward gradient toward the raised section 36.

The fragile section 37 is formed on the raised section 36. The fragile section 37 is an opening section that opens at an outer side of the upper wall 75, an upper side of the outer wall 72, an upper section of an outer side of the front end wall 73, and an upper section of an outer side of the rear end wall 74. The fragile section 37 is covered with the side cover 32.

Here, the inner surface 32a of the side cover 32 abuts the first water stop ribs 41 in a state in which the fragile section 37 is covered with the side cover 32. Accordingly, intrusion of water into the fragile section 37 (i.e., an opening section) can be reliably minimized by the side cover 32 and the first water stop ribs 41.

Further, the opening section opens at the raised section 36 as the fragile section 37. Accordingly, when an impact load F1 is input from above the vehicle body to a rear section 18c (see FIG. 2) or the like of the engine hood 18 due to a collision and the engine hood 18 is deformed downward with respect to the vehicle, deformation or breaking can occur from the fragile section 37. In addition, the raised section 36 is provided on the left end portion 57 of the cowl top 31. Accordingly, stress can be concentrated on the fragile section 37 by the raised section 36 to accelerate deformation or breaking. Accordingly, deformation or breaking can be reliably generated in the fragile section 37 to appropriately absorb the impact load F1.

While the opening section is exemplified as the fragile section 37 in the embodiment, the fragile section 37 can also be configured as a thin wall section or the like as another example.

In addition, a plurality of slits 77 are formed in the outer wall 72 on an upper side to be recessed downward at intervals in the forward/rearward direction of the vehicle body. The slits 77 are formed to be continuous with the fragile section 37 (i.e., the opening section).

In this way, fragility of the outer wall 72 can be appropriately set by forming the plurality of slits 77 in the outer wall 72 in a state in which the outer wall 72 is lengthily formed in the forward/rearward direction of the vehicle body. Accordingly, the outer wall 72 (i.e., the fragile section 37) can be reliably deformed and broken due to the impact load F1 input from above the vehicle body.

While an example in which the plurality of slits 77 are formed in the outer wall 72 on the upper side has been described in the embodiment, at least one slit 77 may be provided in the outer wall 72 on the upper side.

In addition, the drainage passage 38 is formed in a surrounding of the raised section 36. The drainage passage 38 drains water on the upper surface of the cowl top 31 (specifically, the swelling section 51) to an outer side of the vehicle body (a side in front of the vehicle body or a left outer side in the vehicle width direction). The drainage passage 38 has a first drainage passage 81, a second drainage passage 82, a third drainage passage 83 and a fourth drainage passage 84. The first drainage passage 81 is formed along the inner wall 71 of the raised section 36 which is inside in the vehicle width direction. Accordingly, a wall section of the first drainage passage 81 is formed with the inner wall 71. The first drainage passage 81 is provided on the left end 56a of the inclined section 56. The second drainage passage 82 is formed along the outer wall 72 outside the raised section 36 in the vehicle width direction. Accordingly, a wall section of the second drainage passage 82 is formed with the outer wall 72.

Here, the lower side 72a of the outer wall 72 is disposed on the vehicle body below the lower side 71a of the inner wall 71. Accordingly, the second drainage passage 82 is formed on the vehicle below the first drainage passage 81. Here, the outer wall 72 is formed higher than the inner wall 71. Accordingly, the second drainage passage 82 is formed to have a water channel depth dimension larger than that of the first drainage passage 81. Further, the second drainage passage 82 is formed to be inclined on a downward gradient toward a side in front of the vehicle body, and so that the water is drained in front of the hood hinge bracket 22 (see also FIG. 4) in the vehicle body.

A front end of the second drainage passage 82 is in communication with a front end of the first drainage passage 81 through the third drainage passage 83.

The third drainage passage 83 is formed along the front end wall 73. A rear end of the second drainage passage 82 is in communication with a rear end of the first drainage passage 81 through the fourth drainage passage 84. The fourth drainage passage 84 is formed along the rear end wall 74. That is, the first to fourth drainage passages 81 to 84 are formed along a periphery of the raised section 36.

In this way, the drainage passage 38 can be easily formed in a surrounding of the raised section 36 by forming the raised section 36 on the cowl top 31. Accordingly, water on the cowl top 31 can be drained to an outer side of the vehicle body from the drainage passage 38.

In addition, the first to fourth drainage passages 81 to 84 are formed with the cowl top 31 along a periphery of the raised section 36. Accordingly, the drainage passage 38 can be formed without adding dedicated parts of the first to fourth drainage passages 81 to 84 (i.e., the drainage passage 38).

Further, the guide rib 39 is formed on the inclined section 56. The guide rib 39 extends downward obliquely from an upper front section 56b of the inclined section 56 toward a lower rear section 56c (i.e., an inner end of the fourth drainage passage 84), and protrudes toward a left outer side in the vehicle width direction with respect to the inclined section 56. Accordingly, the water on the upper surface of the cowl top 31 can be guided to the inner end of the fourth drainage passage 84 along the guide rib 39 like an arrow A. Further, the water guided to the inner end of the fourth drainage passage 84 can be guided to the rear end of the second drainage passage 82 like an arrow B.

The second drainage passage 82 is formed to have a water channel depth dimension larger than that of the first drainage passage 81. Accordingly, the water can be guided to the second drainage passage 82 having the large water channel depth dimension from the guide rib 39. In this way, a large amount of water guided to the second drainage passage 82 can be drained to an outer side of the vehicle body (a side in front of the vehicle body or a left outer side in the vehicle width direction) via the second drainage passage 82 by guiding the water to the second drainage passage 82 using the guide rib 39 as shown by an arrow C.

In addition, the water guided to the first drainage passage 81 from the inclined section 56 is guided to the inner end of the fourth drainage passage 84 from the first drainage passage 81 like an arrow D. The water guided to the fourth drainage passage 84 can be drained to an outer side of the vehicle body (a side in front of the vehicle body or a left outer side in the vehicle width direction) via the fourth drainage passage 84 as shown by an arrow E.

In this way, intrusion of water to an air-conditioner intake port below the cowl top 31 can be reliably minimized by draining water in the drainage passage 38.

Figure 9:
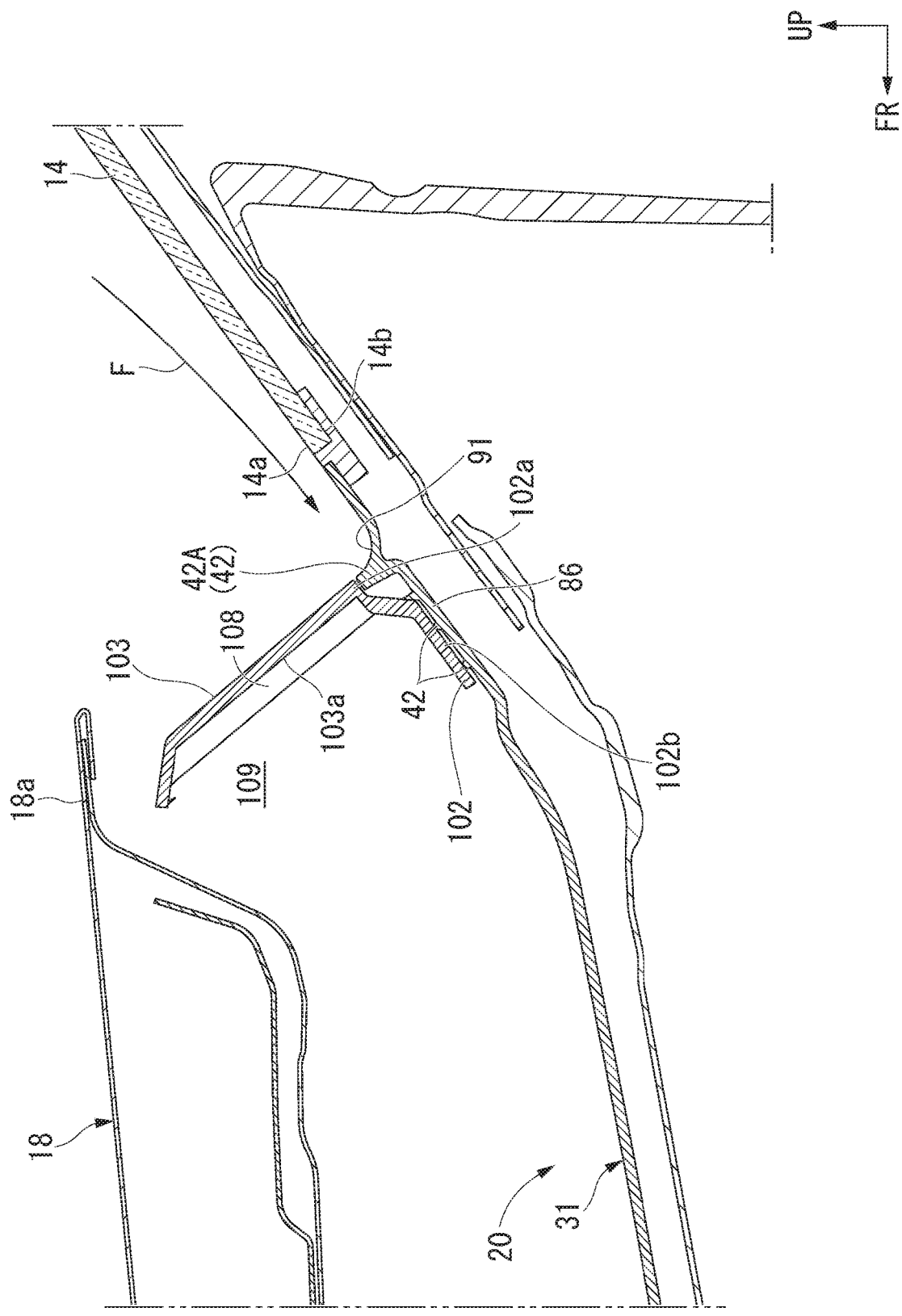
FIG. 9 is a cross-sectional view along line IX-IX in FIG. 2.

As shown in FIG. 8 and FIG. 9, the plurality of second water stop ribs 42 are formed in a cowl left rear section 86, which is rearward of the drainage passage 38 in the cowl top 31 of the vehicle body, to extend in the vehicle width direction at intervals in the forward/rearward direction of the vehicle body. The second water stop ribs 42 stand upward from the upper surface of the cowl left rear section 86. A lower area 102a of a shielding section 103 (to be described below) in the side cover 32 and a front area 102b of the shielding section 103 abut the second water stop ribs 42. The lower area 102a is an area of the shielding section 103 below the vehicle body. The front area 102b is an area of the shielding section 103 in front of the vehicle body.

Accordingly, intrusion of the water from between the side cover 32 and the cowl left rear section 86 toward the cowl top 31 can be minimized by the water guided to the cowl left rear section 86 as shown by an arrow F using the second water stop ribs 42.

Hereinafter, among the plurality of second water stop ribs 42, the second water stop rib 42 of the rearmost side of the vehicle body will be described as "a second water stop rib 42A." A shielding drainage passage 91 is formed along a vehicle body rear side of the second water stop rib 42A of the rearmost side of the vehicle body to extend in the vehicle width direction. Accordingly, the water, intrusion of which is minimized by the second water stop rib 42A, can be drained to an outer side of the vehicle body via the shielding drainage passage 91.

While the example in which the lower area 102a and the front area 102b of the side cover 32 abut the second water stop ribs 42 has been described in the embodiment, as another example, one of the lower area 102a and the front area 102b may also abut the second water stop ribs 42.

As shown in FIG. 7, in the cowl top 31, the maintenance opening 43 is provided in a front area of the inclined section 56, the raised section 36, and the like in the vehicle body. That is, the maintenance opening 43 is provided in front of the side cover 32 that covers the inclined section 56 and the raised section 36 with respect to the vehicle body.

The maintenance opening 43 is formed in a rectangular shape when seen in a plan view. Accordingly, for example, in the case of the configuration in which the cowl top 31 is installed above the damper base 16 (see FIG. 5), a damper can be easily assembled from the maintenance opening 43.

In addition, the maintenance opening 43 has a circumferential edge portion 43a raised upward. Accordingly, intrusion of water into the maintenance opening 43 can be minimized by the circumferential edge portion 43a.

Figure 6B:
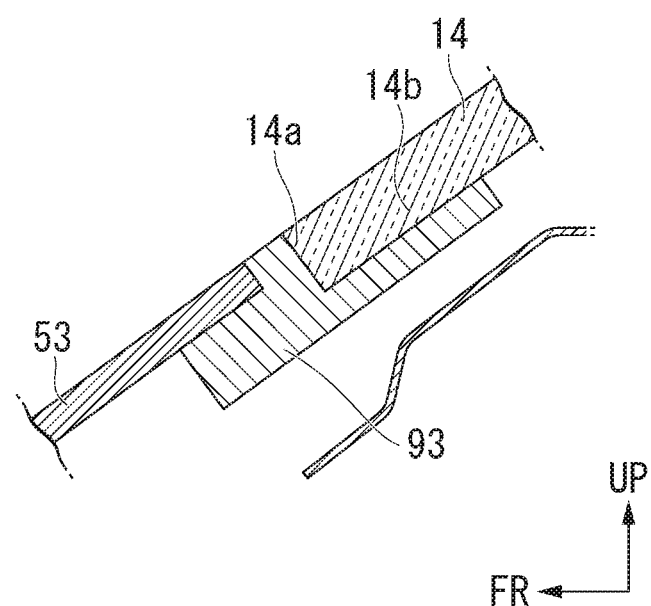
FIG. 6B is an enlarged cross-sectional view of a portion VIb in FIG. 6A.

As shown in FIG. 6A and FIG. 6B, the rear flange 53 of the cowl top 31 is disposed (placed) on a connecting tool 93. The connecting tool 93 is disposed below a surface of the front glass 14 by being disposed on a lower end portion 14b of the front glass 14. In a state in which the rear flange 53 is placed on the connecting tool 93, a boundary between the front glass 14 and the cowl top 31 (specifically, the rear flange 53) can be planarized (flattened).

Figure 10:
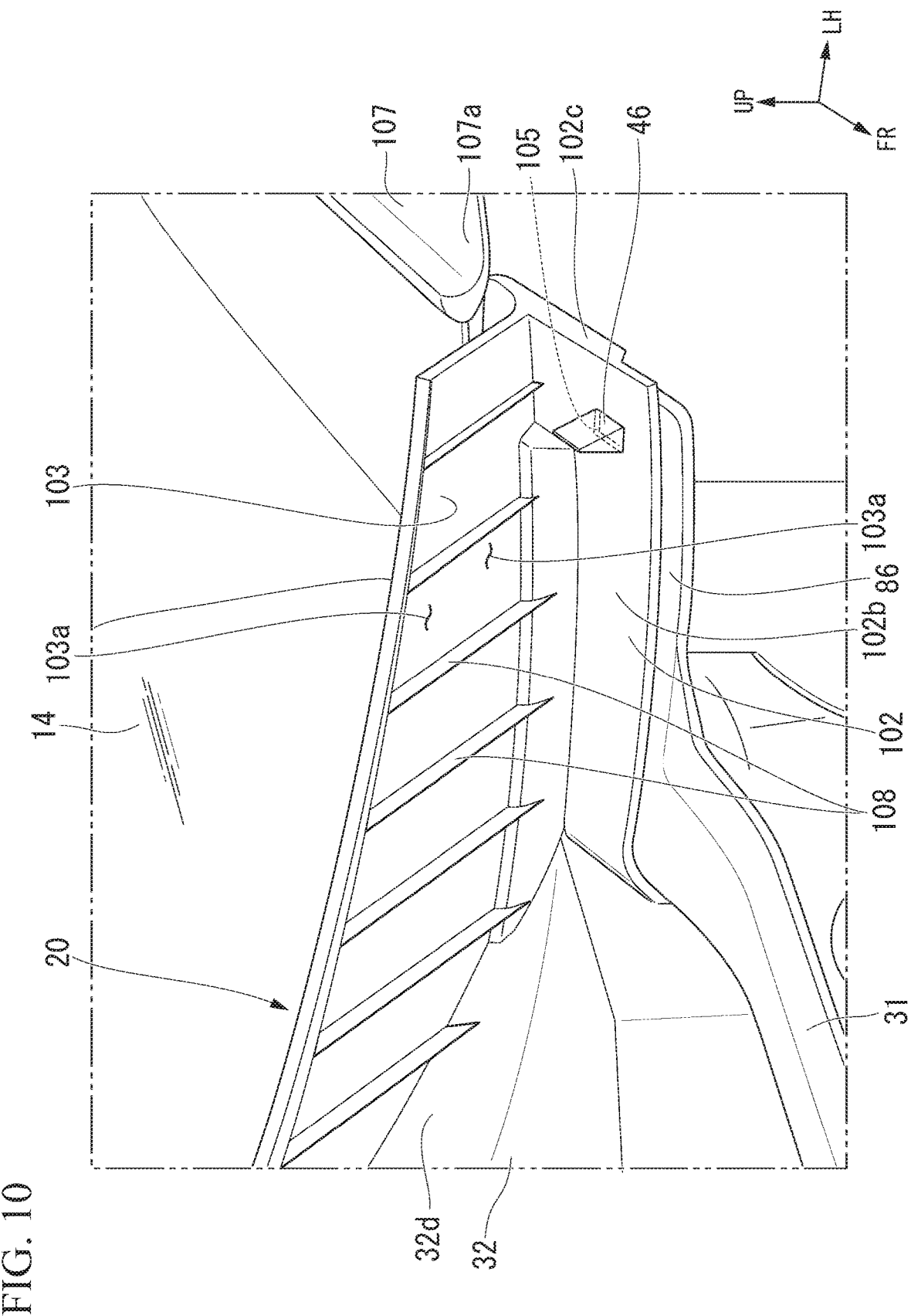
FIG. 10 is an enlarged perspective view of a portion X in FIG. 4.

As shown in FIG. 8 and FIG. 10, the cowl left rear section 86 includes the cowl clip 46 and the plurality of cowl holes 47. The cowl clip 46 protrudes at an upward gradient toward a side in front of the vehicle body in an area of the cowl left rear section 86 close to a left edge 86a. The cowl clip 46 is fitted into a locking hole 105 (to be described below) of the side cover 32.

The plurality of cowl holes 47 are formed inside the cowl clip 46 in the vehicle width direction at intervals in the vehicle width direction. The cowl holes 47 are fitted onto locking clips 104 (to be described below) of the side cover 32 (see FIG. 11).

Figure 12:
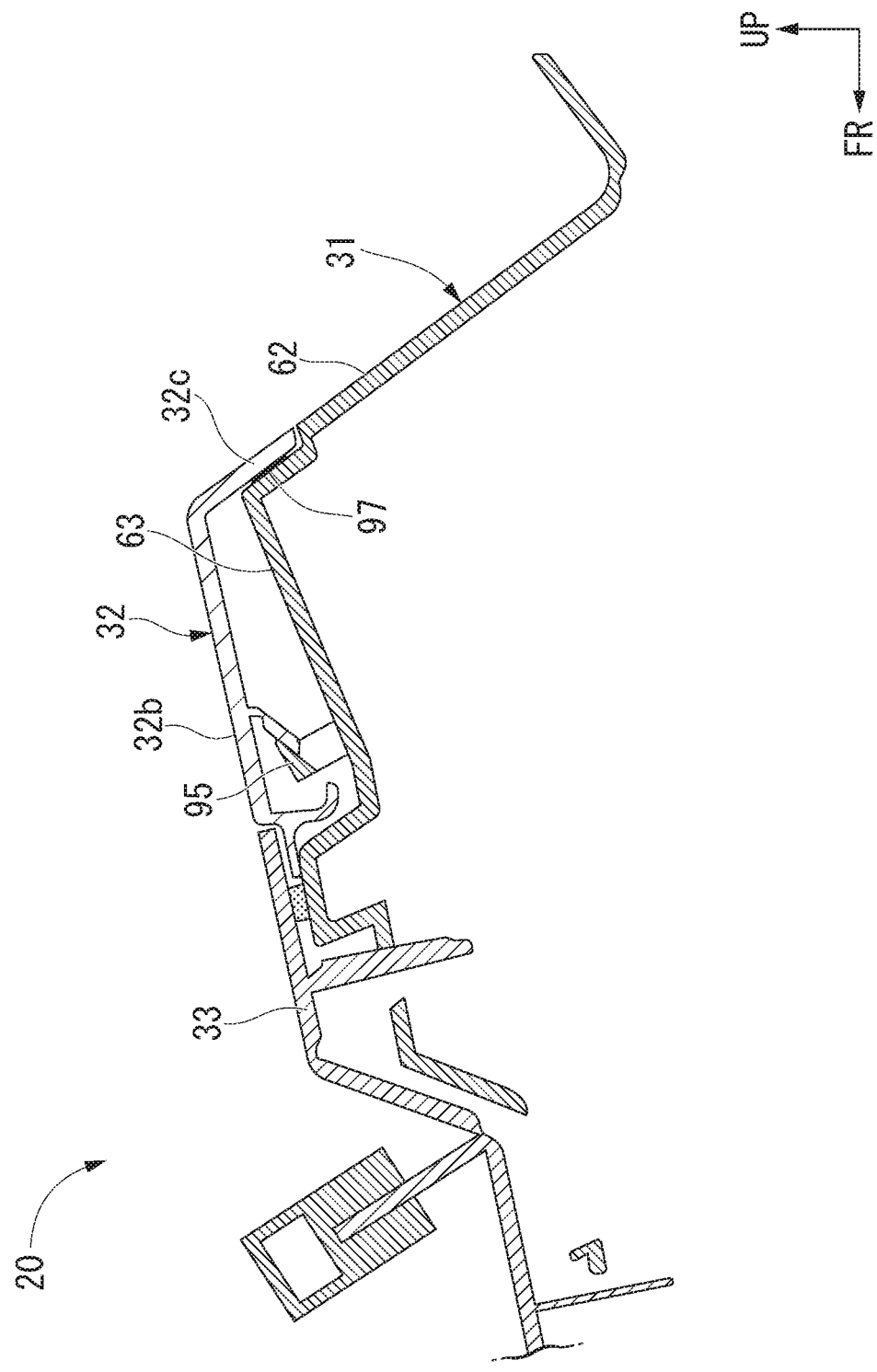
FIG. 12 is a cross-sectional view along line XII-XII in FIG. 3.

As shown in FIG. 5 and FIG. 12, the fragile section 37 (i.e., an opening section) of the cowl top 31 is covered with the side cover 32. The side cover 32 is formed of a soft material (for example, olefin-based elastomer (TPO)). In addition, the side cover 32 is attached to the cowl top 31 when a front end portion 32b is engaged with the apex section 63 of the cowl top 31 via an engaging section 95 and a rear end portion 32c is adhered to the rear wall 62 of the cowl top 31 by an adhesive agent 97. In this way, since the side cover 32 is attached to the cowl top 31 by the engaging section 95 or the adhesive agent 97, the side cover 32 can be easily and reliably attached to the cowl top 31.

Figure 11:
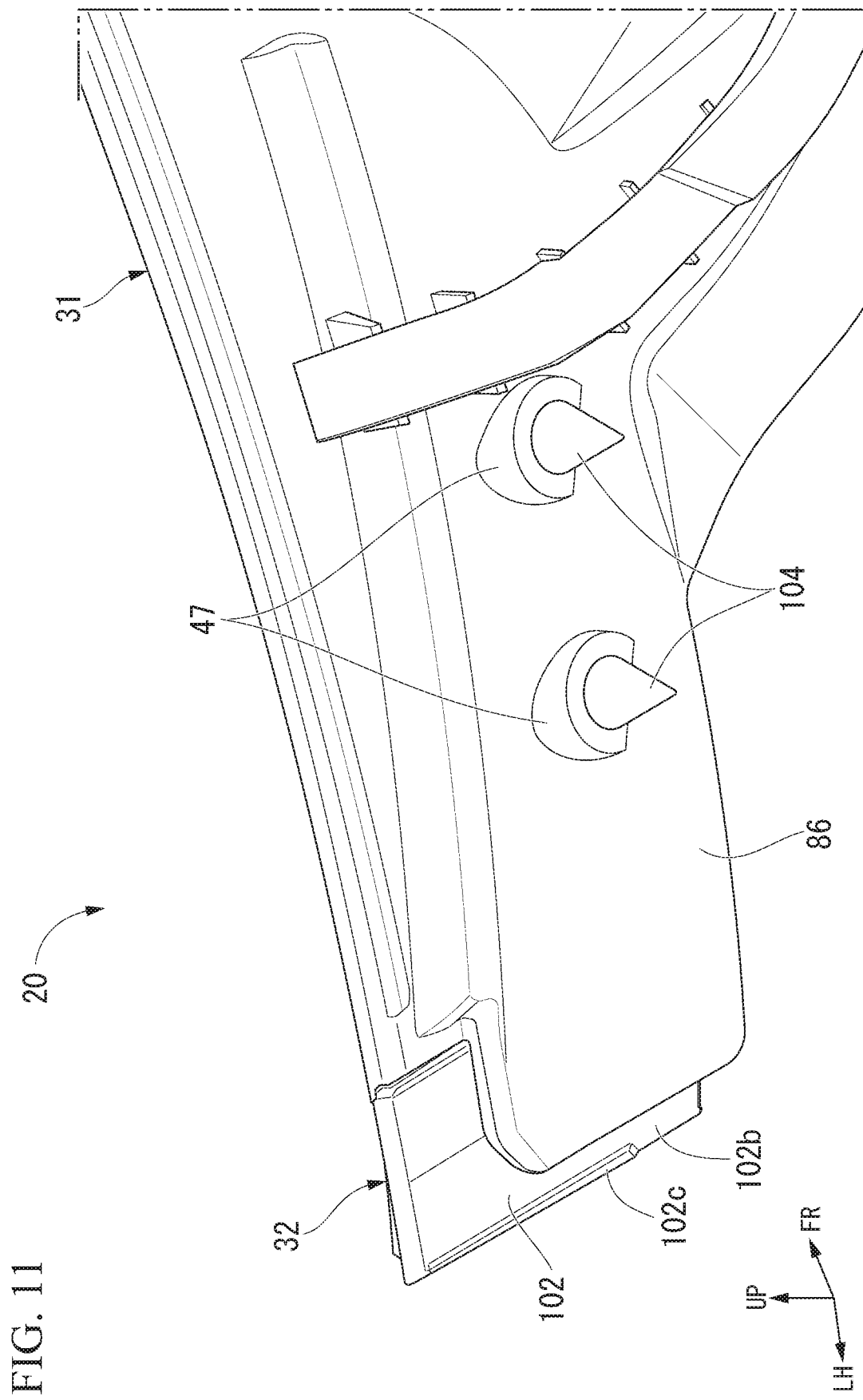
FIG. 11 is a perspective view of a rear outer end portion of the cowl top structure according to the present invention from below.

As shown in FIG. 2, FIG. 10 and FIG. 11, the side cover 32 includes an extension section 102, the shielding section 103, the plurality of locking clips 104 and the locking hole 105.

The extension section 102 protrudes along the cowl left rear section 86 of the cowl top 31 toward a left outer side in the vehicle width direction, and is disposed on the vehicle body below a lower end portion 107a of a front pillar garnish 107. The front pillar garnish 107 is a decoration member that covers a front pillar (an A pillar) 12 (see FIG. 4) from an outer side of the vehicle.

The cowl top 31 can be detached and attached by disposing the extension section 102 at the vehicle body below the lower end portion 107a of the front pillar garnish 107 in a state in which the front pillar garnish 107 is not removed from the vehicle 10. Accordingly, it is possible to increase a degree of freedom of maintenance of a wiper repair, an assembly sequence, or the like.

As shown in FIG. 9 and FIG. 10, the shielding section 103 stands up from an upper end portion 32d of the side cover 32 and the cowl left rear section 86 toward the rear end portion 18a of the engine hood 18. Accordingly, a gap 109 between the side cover 32 and the rear end portion 18a of the engine hood 18 can be closed by the shielding section 103.

The shielding section 103 has a plurality of reinforcement ribs 108. The reinforcement ribs 108 stand up on a back surface 103a of the shielding section 103. Accordingly, the shielding section 103 can be reinforced with the reinforcement ribs 108. Accordingly, the shielding section 103 can be thinned, and the shielding section 103 can be reduced in weight.

In addition, in the extension section 102, the lower area 102a and the front area 102b of the shielding section 103 abut the second water stop ribs 42.

As shown in FIG. 10 and FIG. 11, the front area 102b of the extension section 102 includes the plurality of locking clips 104 and the locking holes 105. The locking hole 105 is formed in an area of the extension section 102 close to a left edge 102c. The locking hole 105 is locked to the cowl clip 46 while being fitted onto (engaged with) the cowl clip 46. The plurality of locking clips 104 are provided further inside in the vehicle width direction than the locking holes 105, and protrude at a downward gradient toward a side behind the vehicle body at intervals in the vehicle width direction. The locking clips 104 are locked to the cowl holes 47 while being fitted into (engaged with) the cowl holes 47.

Here, it is considered that an adhering surface cannot be secured on the cowl left rear section (the rear outer end portion) 86 of the side cover 32 or the extension section (the outer end portion) 102 of the cowl top 31. In this state, the extension section 102 can be easily and reliably attached to the cowl left rear section 86 by forming the locking clips 104 or the locking holes 105 in the extension section 102.

Returning to FIG. 7, in the cowl top 31, the maintenance opening 43 is provided on a side in front of the inclined section 56, the raised section 36, and the like in the vehicle body. The maintenance opening 43 is covered by the maintenance cover 33. Accordingly, intrusion of water into the maintenance opening 43 can be minimized by the maintenance cover 33.

In addition, for example, the damper can be easily assembled from the maintenance opening 43 by removing the maintenance cover 33 from the maintenance opening 43.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A cowl top structure comprising a cowl top provided along a lower edge of a front glass of a vehicle in a vehicle width direction, the cowl top structure comprising:
    a raised section formed on an outer end portion of the cowl top;
    a fragile section formed on the raised section; and
    a drainage passage configured to drain water to an outer side of a vehicle body;
    wherein the drain passage comprises:
    a first drainage passage that is formed along an inner wall of the raised section which is inside in the vehicle width direction; and
    a second drainage passage formed along an outer wall of the raised section which is outside in the vehicle width direction and formed below the first drainage passage in the vehicle.

2. The cowl top structure according to claim 1, wherein the cowl top comprises:
    an inclined section provided inside the raised section in the vehicle width direction and formed to have a downward gradient toward the raised section; and
    a guide rib formed on the inclined section and configured to guide water to the second drainage passage.

3. The cowl top structure according to claim 2, wherein the second drainage passage is inclined on a downward gradient toward a front of the vehicle body and drains water to a front of a hood hinge bracket in the vehicle body.

4. The cowl top structure according to claim 1, wherein the fragile section that is an opening section is covered with a side cover.

5. The cowl top structure according to claim 4, wherein the raised section comprises an outer wall which is outside in the vehicle width direction and which is disposed in a forward/rearward direction of the vehicle body and comprises at least one slit formed in the outer wall in the forward/rearward direction of the vehicle body, and
    the slit is continuous with the opening section.

6. The cowl top structure according to claim 4, wherein the cowl top comprises a first water stop rib formed on an upper wall of the raised section and abutting an inner surface of the side cover.

7. The cowl top structure according to claim 4, wherein the side cover has a shielding section standing up toward a rear end portion of an engine hood.

8. The cowl top structure according to claim 7, wherein the cowl top comprises a second water stop rib standing up from an upper surface of the cowl top and abutting at least one of the side covers below the vehicle body and the side covers in front of the shielding section.

9. The cowl top structure according to claim 7, wherein the shielding section has a reinforcement rib standing up on a back surface of the shielding section.

10. The cowl top structure according to claim 4, wherein the side cover is formed of a soft material, and has an extension section protruding outward from the cowl top in the vehicle width direction, and
    the extension section is disposed on the vehicle body below a lower end portion of a front pillar garnish.

11. The cowl top structure according to claim 4, wherein the cowl top comprises a maintenance opening having a circumferential edge portion thereof raised on the vehicle body in front of the side cover, and
    the maintenance opening is covered by a maintenance cover.

12. The cowl top structure according to claim 1, wherein the cowl top has a front end portion fixed to a dash upper lid installed below the cowl top.

13. The cowl top structure according to claim 4, wherein the side cover is attached to the cowl top through adhesion or engagement.

14. The cowl top structure according to claim 4, wherein the side cover comprises at least one of a locking clip and a locking hole engageable with a rear outer end portion of the cowl top.

\* \* \* \* \*